July 30, 1968     C. N. DAVEY     3,394,585
ULTRASONIC MEASURING APPARATUS
Filed Sept. 20, 1965
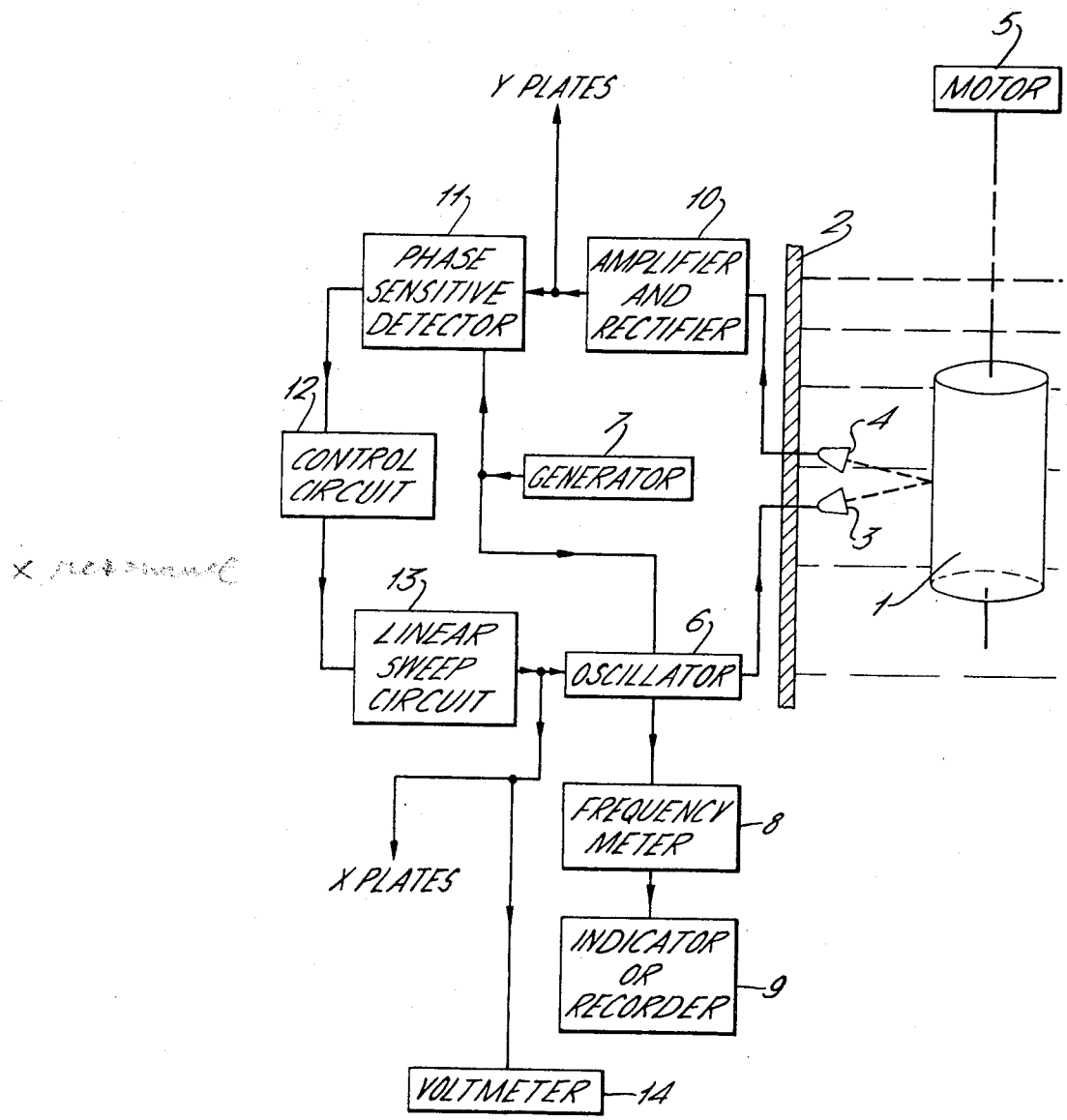

3,394,585
ULTRASONIC MEASURING APPARATUS
Cyril Norman Davey, Wash Common, Newbury, England, assignor to United Kingdom Atomic Energy Authority, London, England
Filed Sept. 20, 1965, Ser. No. 488,634
Claims priority, application Great Britain, Sept. 22, 1964, 38,692/64
4 Claims. (Cl. 73—67.7)

ABSTRACT OF THE DISCLOSURE

Apparatus for investigating the thickness of a specimen including a transmitter for directing a ultrasonic signal at the surface of a specimen immersed in a liquid and an ultrasonic receiver for receiving the ultrasonic signal received from the front and rear surfaces of the specimen. The transmitted signal is frequency modulated about a mean frequency and compared with the received signal to derive a control signal. The said mean frequency is varied in dependence upon the control signal such that the amplitude of the received signal tends to become a minimum at resonance. Recording apparatus may also be provided to record the mean frequency of the transmitted signal.

---

This invention relates to ultrasonic measuring apparatus.

According to the present invention, ultrasonic measuring apparatus for investigating the thickness of a specimen comprises an ultrasonic transmitter arranged to direct an ultrasonic signal at a small area of the surface of the specimen whilst the specimen is immersed in a liquid, an ultrasonic receiver arranged to receive the ultrsonic signals resulting from reflection at the front and rear surfaces of the specimen, means to frequency modulate the transmitted signal about a mean frequency, means to compare the received signal with the modulating signal to derive a control signal, means to vary said mean frequency in dependence upon the control signal such that the amplitude of the received signal tends to become a minimum, and means to indicate and/or record the frequency of the transmitted signal.

Ultrasonic measuring apparatus in accordance with the present invention will now be described by way of example with reference to the accompanying drawing which shows the apparatus diagrammatically.

The apparatus will be described as being used where the specimen is a tube the wall thickness of which is to be investigated, although clearly it is not limited to this application.

Referring now to the drawing, the tube 1, the wall thickness of which is to be investigated, is immersed in a water bath 2, the ends of the tube 1 being sealed so that it is filled with air. Also immersed in the water bath 2 are two barium titanate piezoelectric crystals 3 and 4, the crystal 3 forming an ultrasonic transmitter and the crystal 4 forming an ultrasonic receiver. The crystals 3 and 4 are both directed substantially radially towards the same small area on the surface of the tube 1, and the tube 1 is driven by a motor 5, which rotates and/or translates the tube 1 such that this area scans the surface of the tube 1.

The crystal 3 is powered by an oscillator 6 which is conveniently a voltage to frequency converter. The oscillator 6 has a mean frequency of operation $f$, but the actual frequency alternate between $f-df$ and $f+df$ under the control of a square wave generator 7. In a particular embodiment of the apparatus the mean frequency $f$ is 5.0 megacycles per second, $f-df$ and $f+df$ are 4.9 and 5.1 megacycles per second, respectively, and the generator 7 operates at 10 kilocycles per second. The mean frequency $f$ of the oscillator 6 is shown on a frequency meter 8, to which a further indicating and/or recording device 9 is connected. The device 9 may, for example, be a printer which prints out the reading of the meter 8 in digital form at intervals.

The signal supplied by the crystal 4 is passed to a wide band amplifier and rectifier 10, the output of which is supplied to a phase sensitive detector 11 together with a reference signal derived from the generator 7. The detector 11 supplies a direct current control signal, the level of which is in proportion to the slope of the amplitude/frequency characteristic of the received signal. This control signal passes by way of a control circuit 12 to a linear sweep circuit 13, which operates at 20 cycles per second. The sweep circuit 13 supplies a voltage signal to the oscillator 6 to control the mean frequency of operation of the oscillator 6. This signal is also supplied to a voltmeter 14.

The operation of the apparatus is as follows. The amplitude of the signal supplied by the crystal 4 to the amplifier and rectifier 10 varies in dependence upon the frequency of the signal transmitted by the crystal 3 and is a minimum at resonance when the path length of the ultrasonic signal in the wall of the tube 1 is an odd integral number of half wavelengths. This path length is twice the wall thickness of the tube 1.

Initially the mean frequency of the signal supplied by the crystal 4 is set manually such that the frequency range resulting from the control of the oscillator 6 by the sweep circuit 13 includes the frequency corresponding to the desired minimum. This is conveniently done by supplying the signal from the amplifier and rectifier 10, and the signal from the sweep circuit 13, to the Y and X plates respectively of an oscilloscope.

After this initial setting the apparatus operates automatically. The received signal as supplied by the amplifier and rectifier 10 is compared by the phase sensitive detector 11 with the signal supplied by the generator 7 to give a direct current control signal the level of which is, as stated above, proportional to the slope of the amplitude/frequency characteristic of the received signal. This control signal is supplied to the sweep circuit 13 in such a sense as to oppose the normal direction of variation in the level of the signal supplied to the oscillator 6 by the sweep circuit 13.

If therefore the apparatus is started with the sweep circuit 13 at the beginning of a cycle, the mean frequency $f$ of operation of the oscillator 6 will change until the minimum amplitude of the received signal is reached. It is arranged that the resulting change in the sign and steepness of the slope which then occurs causes the sweep, and hence the frequency of the oscillator 6, to be held. Subsequent movements in the position of the minimum of the characteristic are followed so long as they are not too rapid. If they are too rapid the minimum is lost and the sweep resumes until the minimum is found again.

Thus the mean frequency $f$ of the oscillator 6 follows the minimum and this frequency, which is indicated by the meter 8, is a measure of the thickness of the wall of the tube 1. The device 9 may record the readings of the meter 8 at intervals as the tube 1 is scanned and/or may operate on the readings of the meter 8 at intervals to convert the frequency measurement into actual wall thickness and print these out in digital form.

In addition the reading of the voltmeter 14 may be recorded, for example by a pen recorder, to give an analogue representation of the thickness of the wall of the tube 1.

It is not essential that the generator 7 supply a square wave signal. The signal may be sinusoidal, and in one such embodiment a frequency of 400 cycles per second was used, the other frequencies being the same as in the embodiment referred to above. In this case therefore the signal supplied by the oscillator 6 was repeatedly swept over the range 4.9 to 5.1 megacycles per second and back.

I claim:

1. Ultrasonic measuring apparatus for investigating the thickness of a specimen comprising an ultrasonic transmitter arranged to direct an ultrasonic signal at a small area of the surface of the specimen whilst the specimen is immersed in a liquid, the said signal being variable over a range of frequencies including a frequency at which resonance occurs within the thickness of the specimen, an ultrasonic receiver arranged to receive the ultrasonic signal resulting from reflection at the front and rear surfaces of the specimen, signal generating means to frequency modulate the transmitted signal about a mean frequency, means to compare the received signal with the modulating signal to derive a control signal, means to vary said mean frequency in dependence upon the control signal such that the amplitude of the received signal tends to become a minimum at resonance, and means to indicate and or record the mean frequency of the transmitted signal.

2. Ultrasonic measuring apparatus for investigating the thickness of a specimen between a first and a second surface of the specimen comprising an ultrasonic transmitter arranged to direct an ultrasonic signal at a small area of the first surface of the specimen whilst the specimen is immersed in a liquid the said signal being variable over a range of frequencies including a frequency at which resonance occurs within the thickness of the specimen, means to move the specimen such that said area scans the first surface of the specimen, an ultrasonic receiver arranged to receive the ultrasonic signal resulting from reflection at the first and second surfaces of the specimen, signal generating means to frequency modulate the transmitted signal about a mean frequency, means to compare the received signal with the modulating signal to derive a control signal, means to vary said mean frequency in dependence upon the control signal such that the amplitude of the received signal tends to become a minimum at resonance and means to indicate and or record the mean frequency of the transmitted signal.

3. Apparatus in accordance with claim 2 wherein said signal generating means to frequency modulate the transmitted signal comprises a square wave generator operating such that the transmitted signal alternates between values $f-df$ and $f+df$ below and above the mean frequency $f$.

4. Apparatus in accordance with claim 2 wherein said signal generating means to frequency modulate the transmitted signal comprises a sinusoidal waveform generator operating such that the transmitted signal is repeatedly swept over a range $f-df$ to $f+df$ about the mean frequency $f$.

References Cited
UNITED STATES PATENTS

| | | | |
|---|---|---|---|
| 3,050,989 | 8/1962 | Henry | 73—67.7 |
| 3,057,188 | 9/1962 | Henry | 73—67.7 |

RICHARD C. QUEISSER, *Primary Examiner.*

JOHN P. BEAUCHAMP, *Assistant Examiner.*